(12) United States Patent
Evans

(10) Patent No.: US 11,155,504 B1
(45) Date of Patent: Oct. 26, 2021

(54) COMBINATION FERTILIZER

(71) Applicant: True Organic Products, Inc., Helm, CA (US)

(72) Inventor: Jacob Matthew Evans, Pebble Beach, CA (US)

(73) Assignee: True Organic Products, Inc., Helm, CA (US)

( * ) Notice: Subject to any disclaimer, the term of this patent is extended or adjusted under 35 U.S.C. 154(b) by 128 days.

(21) Appl. No.: 16/244,451

(22) Filed: Jan. 10, 2019

(51) Int. Cl.
  C05F 3/02 (2006.01)
  C05F 11/00 (2006.01)
  C05G 5/12 (2020.01)

(52) U.S. Cl.
  CPC ............ C05F 3/02 (2013.01); C05F 11/00 (2013.01); C05G 5/12 (2020.02)

(58) Field of Classification Search
  CPC ............ C05F 3/02; C05F 11/00; C05G 5/12
  See application file for complete search history.

(56) References Cited

U.S. PATENT DOCUMENTS

| | | |
|---|---|---|
| 1,501,916 A | 7/1924 | Nikaido |
| 1,599,185 A | 9/1926 | Reich |
| 1,631,252 A | 6/1927 | Dickerson |
| 2,049,524 A | 8/1936 | Stillwell |
| 2,117,087 A | 5/1938 | Formhals |
| 2,315,422 A | 3/1943 | Hildebrandt |
| 2,626,237 A | 1/1953 | Warren |
| 2,738,264 A | 3/1956 | Watson |
| 2,797,986 A | 7/1957 | Zirm |
| 3,249,441 A | 5/1966 | Reynolds et al. |
| 3,284,209 A | 11/1966 | Kelley |
| 3,445,220 A | 5/1969 | Anderson |
| 3,983,255 A | 9/1976 | Bass |
| 4,126,439 A | 11/1978 | Stekoll |
| 4,230,485 A | 10/1980 | Ohlrogge |
| 4,383,846 A | 5/1983 | Newsom |
| 4,424,151 A | 1/1984 | Grealy et al. |
| 4,604,125 A | 8/1986 | Robertiello et al. |
| 4,743,287 A | 5/1988 | Robinson |

(Continued)

FOREIGN PATENT DOCUMENTS

| | | |
|---|---|---|
| AU | 605032 | 10/1990 |
| CN | 101654388 A * | 2/2010 |

(Continued)

OTHER PUBLICATIONS

Beaton, James D. "Bulk blending of dry fertilizer materials for China." Better Crops Int 11.1 (1997): 18-19.*

(Continued)

*Primary Examiner* — Jennifer A Smith
(74) *Attorney, Agent, or Firm* — Hawley Troxell Ennis & Hawley LLP; Philip McKay; Rivkah Young

(57) ABSTRACT

A combination organic fertilizer product provides, based on variable mixtures discussed herein, varying levels of bioavailable nitrogen, suitable for different types of plants having different nitrogen uptake rates. A process for production of a combination organic fertilizer includes combining poultry manure, soybean meal and guano to create a homogeneous combination, and processing the homogeneous combination. Heating, screening and cooling operations are also presented, for inclusion into the process for production disclosed herein.

17 Claims, 1 Drawing Sheet

(56) References Cited

U.S. PATENT DOCUMENTS

| | | |
|---|---|---|
| 4,975,106 A | 12/1990 | Ferguson |
| 4,997,469 A | 3/1991 | Moore |
| 5,177,008 A | 1/1993 | Kampen |
| 5,177,009 A | 1/1993 | Kampen |
| 5,221,313 A | 6/1993 | Mortvedt et al. |
| 5,393,318 A | 2/1995 | Iizuka et al. |
| 5,631,001 A | 5/1997 | Harich et al. |
| 5,634,959 A | 6/1997 | Beaty |
| 5,772,721 A | 6/1998 | Kazemzadeh |
| 5,851,953 A | 12/1998 | Pehu et al. |
| 5,952,267 A | 9/1999 | Mottram |
| 6,083,293 A | 7/2000 | Bath |
| 6,099,654 A | 8/2000 | Kaneko et al. |
| 6,174,472 B1 | 1/2001 | Johnson et al. |
| 6,241,795 B1 | 6/2001 | Svec et al. |
| 6,318,023 B1 | 11/2001 | Yamashita |
| 6,352,569 B1 | 3/2002 | Beran et al. |
| 6,384,266 B1 | 5/2002 | Farone et al. |
| 6,468,562 B2 | 10/2002 | Moilanen et al. |
| 6,524,600 B2 | 2/2003 | Yamashita |
| 6,572,669 B1 | 6/2003 | Creech |
| 6,602,824 B1 | 8/2003 | Miles et al. |
| 7,018,669 B2 | 3/2006 | Kosaka et al. |
| 7,045,165 B2 | 5/2006 | Westberg |
| 7,074,251 B1 | 7/2006 | Rogers et al. |
| 7,678,171 B2 | 3/2010 | Beckley et al. |
| 7,901,481 B2 | 3/2011 | Evans |
| 7,927,397 B1 | 4/2011 | Evans |
| 8,262,765 B2 | 9/2012 | Summer et al. |
| 8,444,742 B2 | 5/2013 | Smith et al. |
| 9,604,887 B2 | 3/2017 | Evans |
| 9,815,744 B2 | 11/2017 | Evans |
| 9,850,178 B2 | 12/2017 | Evans |
| 10,301,226 B2 | 5/2019 | Evans |
| 2002/0048605 A1 | 4/2002 | Moilanen et al. |
| 2002/0186614 A1 | 12/2002 | Millward |
| 2003/0066322 A1 | 4/2003 | Perriello |
| 2003/0172697 A1 | 9/2003 | Sower |
| 2004/0035162 A1 | 2/2004 | Williams et al. |
| 2004/0062832 A1 | 4/2004 | Kemp |
| 2004/0065127 A1 | 4/2004 | Connell |
| 2004/0121914 A1 | 6/2004 | Catalano |
| 2005/0119127 A1 | 6/2005 | Cambri et al. |
| 2006/0228323 A1 | 10/2006 | Novelle et al. |
| 2006/0243009 A1 | 11/2006 | Burnham |
| 2006/0254331 A1 | 11/2006 | Burnham |
| 2007/0102352 A1 | 5/2007 | Burke |
| 2007/0134376 A1 | 6/2007 | Connell |
| 2007/0261451 A1 | 11/2007 | Beckley et al. |
| 2007/0292564 A1 | 12/2007 | Hu et al. |
| 2008/0160522 A1 | 7/2008 | Lee et al. |
| 2008/0260902 A1 | 10/2008 | Van Houten et al. |
| 2009/0211322 A1 | 8/2009 | Skinner |
| 2010/0071429 A1 | 3/2010 | Von Nordenskjold |
| 2010/0136629 A1 | 6/2010 | Li et al. |
| 2011/0120201 A1 | 5/2011 | Evans |
| 2011/0247378 A1 | 10/2011 | Begley et al. |
| 2012/0011910 A1 | 1/2012 | Daniels |
| 2012/0028801 A1 | 2/2012 | Daniels et al. |
| 2012/0231494 A1 | 9/2012 | Li et al. |
| 2013/0130902 A1 | 5/2013 | Roose et al. |
| 2014/0047881 A1 | 2/2014 | Roberts |
| 2014/0060130 A1 | 3/2014 | Purtle |
| 2014/0144195 A1 | 5/2014 | Callendrello et al. |
| 2015/0135784 A1 | 5/2015 | Milnes |
| 2016/0176768 A1 | 6/2016 | Norddahl et al. |
| 2016/0235093 A1 | 8/2016 | Brion et al. |
| 2016/0304409 A1* | 10/2016 | Evans .................. C05F 5/00 |
| 2017/0297962 A1 | 10/2017 | Evans |
| 2017/0320786 A1 | 11/2017 | Evans |
| 2017/0327431 A1 | 11/2017 | Evans |

FOREIGN PATENT DOCUMENTS

| | | |
|---|---|---|
| CN | 102391030 | 3/2012 |
| CN | 102674972 | 9/2012 |
| CN | 102875238 | 1/2013 |
| CN | 103524175 | 1/2014 |
| CN | 103724128 | 4/2014 |
| CN | 102898195 | 6/2014 |
| CN | 103936500 | 7/2014 |
| CN | 104017845 | 9/2014 |
| CN | 104058810 | 9/2014 |
| CN | 104151018 | 11/2014 |
| CN | 104291971 | 1/2015 |
| CN | 104303670 | 1/2015 |
| CN | 104892086 | 9/2015 |
| CN | 108794166 A * | 11/2018 |
| DE | 4324823 | 2/1994 |
| EP | 0145792 | 6/1985 |
| EP | 0411780 | 2/1991 |
| GB | 663133 | 12/1951 |
| JP | 63-107907 | 5/1988 |
| JP | 01208386 | 8/1989 |
| JP | 02-225388 | 9/1990 |
| JP | 04-198080 | 7/1992 |
| JP | 05-043370 | 2/1993 |
| JP | 06107511 | 4/1994 |
| JP | 2004-113032 | 4/2004 |
| JP | 2004-168614 | 6/2004 |
| JP | 4757447 | 8/2011 |
| KR | 100839201 | 6/2008 |
| KR | 101361521 | 2/2014 |
| PL | 159135 | 11/1992 |
| WO | WO 97-24933 | 7/1997 |
| WO | WO-0121556 A1 * | 3/2001 ............ C05G 5/12 |
| WO | WO 2009-096628 | 8/2009 |
| WO | WO 2013-078365 | 5/2013 |

OTHER PUBLICATIONS

Starbuck, Christopher J., and Woody Ornamentals. "Making and Using Compost." Missouri Extension. Retrieved from (2010).*

Penhallegon, Ross. "Nitrogen-phosphorus-potassium values of organic fertilizers." Oregon: Oregon State University Extension Service (2003).*

Biofeed. "Cobalt-6 Liquid Cobalt" <https://biofeed.com/agriculture/cobalt-6-liquid-cobalt/> Obtained Oct. 29, 2020.*

USDA. "7 CFR Part 205.601. National Organic Program, Synthetic substances allowed for use in organic crop production." Fed. Regist. 75 (2021) (Year: 2021).*

Wiedmeier et al., "Effects of Concentrated Separator Dried Beet Pulp on Nutrient Digestibility, Milk Production, and Preference of Holstein Cattle", Journal of Dairy Science, 1994, vol. 77, No. 10, pp. 3051-3057.

Kearney et al., "Raw Juice Chromatographic Separation Process", Proceedings from the 28th Biennial ASSBT Meeting, Operations, New Orleans, LA, Mar. 8-11, 1995, Amalgamated Research, Inc., pp. 1-5.

Midwest Agri Commodities, "Raffinate (Desugared Beet Molasses)", Jul. 10, 2001, 1 page.

Diaz-Zorita, "Applications of Foliar Fertilizers Containing Glycinebetaine Improve Wheat Yields," Argentina Journal of Agronomy and Crop Science (Impact Factor: 2.62), Dec. 2001; 186(3): 209-215.

Decloux et al. "Interest of electrodialysis to reduce potassium level in vinasses." Desalination 146 (2002) pp. 393-398.

Naidu, et al., "Glycinebetaine foliar application increases pasture winter growth and milk yield," Proceedings of the 11th Australian Agronomy Conference, Feb. 2-6, 2003, 2 pages, Geelong, Victoria.

Evans, Analytical Data, 2004-2006.

"Natural Betaine in Personal Care;" DuPont Industrial Biosciences, Jan. 2012. [online], [retrieved Feb. 6, 2017]. Retrieved from the internet <http://www.in-cosmetics.com/_novadocuments/7930>.

Gao, et al., "Effect of spraying glycine betaine on physiological responses of processing tomato under drought stress," Journal of Plant Nutrition and Fertilizer, 2012, 18(2): 426-432.

(56) References Cited

OTHER PUBLICATIONS

"Betaine Plant Fertilizer, Betaine Plant Fertilizer Suppliers and Manufacturers at Alibaba.com," [online], [retrieved Feb. 24, 2015]. Retrieved from the internet <URL: http://www.alibaba.com/showroom/betaine-plant-fertilizer.htm>.

Fernandez-Salvador, Javier, et al.; "Liquid Corn and Fish Fertilizers Are Good Options for Fertigation in Blackberry Cultivars Grown in an Organic Production System;" *HortScience* Feb. 2015 vol. 50 No. 2 pp. 225-233.

\* cited by examiner

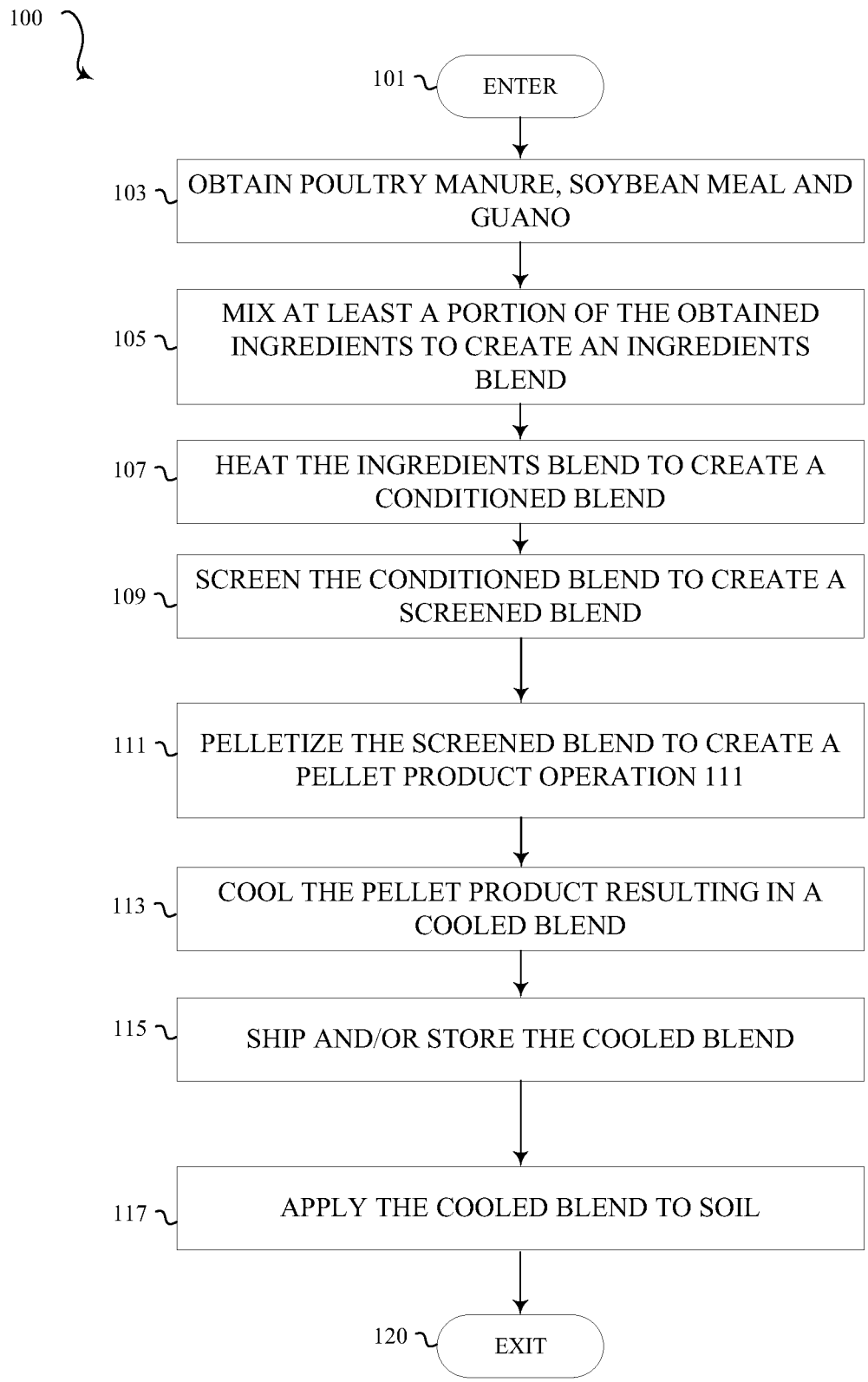

COMBINATION FERTILIZER

BACKGROUND

Over the years, a number of different types of fertilizer compositions have been developed and employed in agriculture. Traditionally, synthetic chemical fertilizer compositions have dominated the fertilizer marketplace. More recently, however, the public has become increasingly aware and concerned about the links between synthetic chemical fertilizer use, environmental degradation, and human illness. For instance, the public is becoming more aware that synthetic chemical fertilizers contain poisons, pollute water, destroy microbes in the soil, lose half their value due to runoff, burn roots, require significant amounts of water, contain less micro-nutrition, and are heavily laden with salt.

Consequently, there has been a significant movement toward fertilizer compositions that are suitable for use in United States Department of Agriculture certified organic crop production. These fertilizer compositions are derived from natural sources and do not rely on synthetic chemicals. Unlike synthetic products, organic fertilizers encourage the growth of microorganisms, which break down old plant material and convert nutrients into food. Consequently, over time, the use of organic fertilizers results in healthier and more fertile soil, which leads to hardier and more robust plants.

Furthermore, consumers are more concerned about health and the environment than ever before and are making purchasing decisions based upon those concerns. As a result, more and more consumers are purchasing organic foods. Studies show that many consumers who purchase organic foods do so because they wish to avoid toxic and persistent pesticides and fertilizers.

Due to the increased demand for organic fertilizer compositions, there is significant interest in developing better organic fertilizer compositions that provide nutrients and reduce the risk of introducing pathogens into the food supply.

Desirable nutrients include, but are not limited to, bioavailable phosphorous, potassium, and nitrogen. These nutrients must not only be present in the fertilizer, but also must be present in sufficient concentrations to benefit agricultural vegetation. In addition, organic fertilizer compositions must be in a form that is readily applied to the agricultural vegetation and/or has minimum impact on the surrounding community. Problematically, many currently available organic fertilizers have low values of phosphorous, potassium, and nitrogen. So low, in fact, that an inconvenient amount of fertilizers must be applied to crops for the crops to receive an acceptable amount of these nutrients.

There is a current need for an environmentally benign fertilizer derived from natural organic sources that provides sufficient levels of usable nutrients in a manageable amount of fertilizer without requiring significant processing or raising environmental concerns.

SUMMARY

In accordance with one embodiment, a process of manufacturing a combination organic fertilizer product is disclosed. As will be discussed herein, the combination organic fertilizer product provides, based on variable mixtures of embodiments discussed herein, varying levels of nitrogen which thus provides for differing levels of bioavailable nitrogen, suitable for different types of plants having different nitrogen uptake rates.

Furthermore, because significant amounts of nitrogen are provided per pound of fertilizer, other materials may be easily included in the combination organic fertilizer product to introduce the presence of various other macro- and micronutrients.

The Inventor has realized that the combination organic fertilizer product formed of three primary ingredients at different percentages depending on the application provides sufficient amounts of available nitrogen to different types of plants having differing nitrogen uptake rates. Ones of the variations of combination organic fertilizer product discussed herein allow adding other materials that would otherwise be inconvenient and inefficient to add into prior art fertilizers because the resulting the nitrogen level of the final prior art fertilizer combination would be too low.

As will be discussed herein, the combination organic fertilizer product may be customized for particular growing conditions, soil, crops, and growers.

In one embodiment, the process of manufacturing a combination organic fertilizer product includes obtaining poultry manure, soybean meal and guano. As one of ordinary skill would readily appreciate, guano is a term referring to the excrement of seabirds and bats. As one of ordinary skill would readily appreciate, soybean meal is produced from soybeans and is often used in animal feeds.

By combining at least a portion of the obtained poultry manure, soybean meal and guano, an organic fertilizer can be ultimately produced that results in an easily customizable nitrogen-rich fertilizer product.

In one embodiment, at least a portion of the poultry manure, soybean meal and guano are conveyed into a mixing container. In one embodiment, the poultry manure, soybean meal and guano portions are mixed to create an ingredients blend.

In one embodiment, the ingredients blend is screened, or otherwise passed through a mesh screen, to create a screened blend. In one embodiment, the screened blend is transferred to a conditioning unit configured for heating, cooling, or both. In one embodiment, one or more of the heating, cooling and pelletizing operations may be performed in overlapping timeframes, such as heating while pelletizing, cooling while pelletizing, heating while pelletizing and then cooling while still pelletizing, or any combination thereof.

In one embodiment, the screened blend is heated to a minimum of 130 degrees Fahrenheit in the conditioning unit to create a conditioned blend. In one embodiment, the conditioned blend is transferred to a pellet mill to pelletize the conditioned blend. Screening may take place before or after cooling and before or after heating, depending on the particular formulation operations employed by a producer of the combination fertilizer product.

In one embodiment, the conditioned blend is processed in the pellet mill to create the pelletized blend. In one embodiment, the pelletized blend is transferred to a dryer. In one embodiment, the pelletized blend is heated in the dryer to create a heated pelletized blend. In one embodiment, the heated pelletized blend is allowed to passively cool in the dryer, or is alternatively actively cooled by passing air over and/or through the heated pelletized blend.

In one embodiment, the heated pelletized blend is transferred to a cooler, or is alternatively cooled in the conditioning unit. In one embodiment, the heated pelletized blend is cooled to a moisture level range of any individual percentage or range of percentages between 4% and 20% by passing air through the heated pelletized blend to create cooled product.

In one embodiment, the cooled product is filtered to create a pellet product. In one embodiment, the pellet product is transferred to a storage and/or shipping container. In one embodiment, the pellet product is tested for pathogens and then heated or otherwise treated if any pathogens are found.

In one embodiment, the pellet product is applied to soil to support crop growth.

Using the process for production of a combination organic fertilizer product disclosed herein, a combination organic fertilizer product is provided that is environmentally benign; is non-pathogenic; is derived from natural organic sources; does not require significant processing; has minimal odor; can be applied directly to soil supporting vegetation; is easily handled and transported; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 1 is a flow chart of a process for creating a combination organic fertilizer product, in accordance with one embodiment.

Common reference numerals are used throughout the FIGURE and the detailed description to indicate like elements. One skilled in the art will readily recognize that the above figures are examples and that other processes, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGURE, which depicts exemplary embodiments. Embodiments may be embodied in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, a process for organic fertilization using a combination organic fertilizer product includes creating a combination organic fertilizer product and applying the combination organic fertilizer product to fields/soil/substrate supporting agricultural vegetation.

As used herein, the term "organic fertilizer" means an ingredient or product that may be used in certified organic crop production in accordance with USDA National Organic Program standards.

FIG. 1 is a flow chart of a process 100 for creating a combination organic fertilizer product, in accordance with one embodiment. As shown in FIG. 1, process 100 for creating a combination organic fertilizer product begins at ENTER OPERATION 101 and process flow proceeds to OBTAIN POULTRY MANURE, SOYBEAN MEAL AND GUANO OPERATION 103.

In one embodiment, at OBTAIN POULTRY MANURE, SOYBEAN MEAL AND GUANO OPERATION 103, a quantity of poultry manure, a quantity of soybean meal, and a quantity of guano are all obtained. The quantities obtained are, in one embodiment, representative of the percentages of poultry manure, soybean meal, and guano desired in the final product, or may be different quantities. The actual obtained quantities are not necessarily important, so long as the later process operations involving mixing particular percentage amounts to form a final combination organic fertilizer product results in a desired nitrogen percentage, based on a particular plant, plant type, or variety the combination organic fertilizer product is designed to support. For the sake of clarity, when a percentage of a given ingredient is discussed, it is intended that the percentage is by dry weight, and the percentage is generally of an ingredient as compared with the total weight of the final mixture.

In one embodiment, at OBTAIN POULTRY MANURE, SOYBEAN MEAL AND GUANO OPERATION 103, if an additive is going to be added to the poultry manure, soybean meal, and guano, that additive is also obtained. For the sake of clarity, poultry manure, soybean meal, and guano will often be referred to herein as ingredients. Further, should an additive be used, it is also sometimes referred to as an ingredient, depending on context.

In one embodiment, following the obtaining of the one or more ingredients at OBTAIN POULTRY MANURE, SOYBEAN MEAL AND GUANO OPERATION 103, process flow proceeds to MIX AT LEAST A PORTION OF THE OBTAINED INGREDIENTS TO CREATE AN INGREDIENTS BLEND OPERATION 105.

In one embodiment, at MIX AT LEAST A PORTION OF THE OBTAINED INGREDIENTS TO CREATE AN INGREDIENTS BLEND OPERATION 105 particular quantities of the individual ingredients are selected for mixing, based at least in part on the nitrogen percentage desired in the final combination organic fertilizer product, and are subsequently mixed. In one embodiment, the selected individual ingredients are conveyed into a stainless steel or other mixing container prior to the ingredients being mixed.

In this disclosure, reference is occasionally made to nitrogen percentages resulting from particular combinations of poultry manure, soybean meal, and guano, and possibly also with one or more additives that may or may not provide a measurable amount of bioavailable nitrogen. Those of ordinary skill will readily recognize that additional additives could be added to the poultry manure, soybean meal, and guano which would affect the nitrogen range of the final combination. Unless actually claimed, therefore, nitrogen percentages are considered to be references, not absolute. For example, a nitrogen range specified for a given ingredients blend below is intended to be an approximation of a result of combining the given percentages of the various ingredients. However, in the case of the ingredient percentages adding up to less than 100% of a given blend, an additional nitrogen-rich additive being added to the combination might push the resulting nitrogen percentage of the final combination above a nitrogen level that would have otherwise occurred if the additive had not been present. Depending on the particular additive, the resulting nitrogen level could also be lower than would have otherwise occurred if the additive had not been present.

In one embodiment, with respect to a first ingredients blend, to produce a combination organic fertilizer product having nearly so or equal to 4% Nitrogen, or in a range of 3% to 5% nitrogen, a mixture is formed having a quantity of components that is 70-90% poultry manure, 1-20% soybean meal and 1% to 20% guano. Otherwise, in one embodiment, a mixture is formed having a quantity of ingredients that is 80% poultry manure, 10% soybean meal and 10% guano. In various embodiments, variations of the quantities of the ingredients are allowed to result in final mixture percentages having 80±5% poultry manure, 10±5% soybean meal and 10±5% guano.

In one embodiment, with respect to a second ingredients blend, to produce a combination organic fertilizer product having nearly so or equal to 8% Nitrogen, or in a range of 7% to 9% nitrogen, a mixture is formed having a quantity of ingredients that is 1-20% poultry manure, 60-90% (or, for example, a range of 80±10%) soybean meal and 9% to 30% guano. Otherwise, in one embodiment, a mixture is formed having a quantity of components that is 10% poultry manure, 70% soybean meal and 20% guano. In various embodiments, variations of the quantities of the ingredients are allowed to result in 10±5% poultry manure, 70±5% soybean meal and 20±5% guano.

In one embodiment, with respect to a third ingredients blend, to produce a combination organic fertilizer product having nearly so or equal to 6% Nitrogen, or in a range of 5% to 7% nitrogen, a mixture is formed having a quantity of components that is 50-70% poultry manure, 10-30% soybean meal and 10% to 30% guano. Otherwise, in one embodiment, a mixture is formed having a quantity of components that is 60% poultry manure, 20% soybean meal and 20% guano. In various embodiments, variations of the quantities of the ingredients are allowed to result in 60±5% poultry manure, 20±5% soybean meal and 20±5% guano.

In one embodiment, with respect to a fourth ingredients blend to produce a combination organic fertilizer product having nearly so or equal to 12% Nitrogen, or in a range of 11% to 13% nitrogen, a mixture is formed having a quantity of components that is 1-20% poultry manure, 10-30% soybean meal and 60% to 80% guano. Otherwise, in one embodiment, a mixture is formed having a quantity of components that is 10% poultry manure, 20% soybean meal and 70% guano. In various embodiments, variations of the quantities of the ingredients are allowed to result in 10±5% poultry manure, 20±5% soybean meal and 70±5% guano.

In any of the first, second, third, and fourth ingredients blends, there may be situations where the combined percentages of the poultry manure, soybean meal, and guano do not add up to 100%. In such a situation, other inert or active ingredients are be added, depending on the situation, the application the fertilizer is designed for, etc., to fill out the entire mixture at 100%. Thus, in the case of the poultry manure, soybean meal, and guano percentages adding to 81%, a quantity of additive is added to the poultry manure, soybean meal, and guano which is representative of 19% of the total ingredients blend. If an additive contains bioavailable nitrogen, the estimated nitrogen percentages of the various specific blends listed above and discussed herein will be above or below the actual final resulting nitrogen percentage of the final combination mixture having the nitrogen-rich additive, due to the contribution of the additive.

In one embodiment, the selected individual ingredients are mixed for up to three minutes. In one embodiment, the selected individual ingredients are mixed long enough to achieve a homogeneous mixture. For the purposes of this disclosure, a homogeneous mixture means that when dividing the volume of mixed ingredients in half, the same quantities of individual ingredients, e.g. within 2%, are suspended in both halves of the blend. So, if a mixture is, for example, 80% poultry manure, and the total volume of ingredients being combined is 20 cubic feet, the 20 cubic feet of combined ingredients is considered homogeneously mixed with respect to the poultry manure when two half-portions of the combined ingredients each contain within 80±2% poultry manure. For example, one half of the homogeneous mixture could contain 78% poultry manure while the other half contains 81% poultry manure.

In one embodiment, once the ingredients are mixed to create an ingredients blend at MIX AT LEAST A PORTION OF THE OBTAINED INGREDIENTS TO CREATE AN INGREDIENTS BLEND OPERATION 105, process flow proceeds to HEAT THE INGREDIENTS BLEND TO CREATE A CONDITIONED BLEND OPERATION 107. In one embodiment, the ingredients blend is heated to at least 130° F. resulting in a conditioned blend. In one embodiment, the ingredients blend is heated to between 130° F. and 200° F. resulting in a conditioned blend. In one embodiment, the ingredients blend is heated for up to 4 hours. In one embodiment, the ingredients blend is heated at or above 130 degrees Fahrenheit for at least 24 hours to ensure uniform heat transfer to the ingredients blend. In one embodiment, the ingredients blend is heated for 120 hours or more.

In various embodiments, heating may alternatively take place with one or more ingredients being heated with one or more other ingredients, or by themselves, prior to being combined or otherwise mixed with one or more other ingredients. Thus, in various embodiments, the poultry manure, and/or the soybean meal, and/or the guano is individually heated, or the poultry manure and the soybean meal are heated together while the guano and an additive are heated individually, even with respect to each other, or any combination of any ingredients are heated individually or together, prior to the entire set of ingredients being combined, as discussed herein prior to MIX AT LEAST A PORTION OF THE OBTAINED INGREDIENTS TO CREATE AN INGREDIENTS BLEND OPERATION 105. Alternatively, two or more ingredients are combined and heated together, according to one embodiment, prior to mixing with a third and/or fourth ingredient which isn't heated, or which is alternatively individually heated prior to being combined with the mixture of the two other heated ingredients. Finally, two or more ingredients may be combined, heated or not, and mixed homogeneously prior to the homogeneous mixture of the other two ingredients being combined with the third or the three ingredients. Further, regardless of whether one or more ingredients are individually heated prior to MIX AT LEAST A PORTION OF THE OBTAINED INGREDIENTS TO CREATE AN INGREDIENTS BLEND OPERATION 105 a mixed blend may be heated after mixing, according to the principles discussed herein.

In one embodiment, once the ingredients blend is heated to create a conditioned blend at HEAT THE INGREDIENTS BLEND TO CREATE A CONDITIONED BLEND OPERATION 107, process flow proceeds to SCREEN THE CONDITIONED BLEND TO CREATE A SCREENED BLEND OPERATION 109.

In one embodiment, screening includes screening ingredients at any time using a screen having any mesh size. In various embodiments, the screening takes place before or after the ingredients are mixed. In various embodiments, the screening takes place before or after a heating process operation, independent of whether that heating process operation takes place using one or more individual ingredients prior to mixing, or alternatively takes place after one or more ingredients are mixed with one or more other ingredients. Thus, in various embodiments, one or more ingredients are or are not heated and/or filtered, while others are treated differently. Regardless of the timing of the screening process operation, in various embodiments, one or more of the ingredients are screened, before or after being combined or mixed, using a screen having a standard wire mesh size between ¼ inch and 1 inch. In various embodiments, the standard mesh size includes one or more mesh sizes of ¼ inch, ⅜ inch, ½ inch, ⅝ inch, ¾ inch, ⅞ inch, and 1 inch.

In one embodiment, the screened blend, or mixture that hasn't been screened, is heated at or above 130 degrees Fahrenheit for up to 4 hours. In one embodiment, the screened blend is heated at or above 130 degrees Fahrenheit for at least 24 hours to ensure uniform heat transfer to the screened blend. In one embodiment, the screened blend is heated for 120 hours or more.

Following completion of SCREEN THE INGREDIENTS BLEND TO CREATE A SCREENED BLEND OPERATION 109, process flow proceeds with PELLETIZE THE SCREENED BLEND TO CREATE A PELLET PRODUCT OPERATION 111. In one embodiment, the screened blend is heated again, or is still heated from being previously heated, prior to being pelletized at PELLETIZE THE SCREENED BLEND TO CREATE A PELLET PRODUCT OPERATION 111. In one embodiment, the screened blend is pelletized using a pellet mill.

In one embodiment, once the screened blend is pelletized to create a pellet product at PELLETIZE THE SCREENED BLEND TO CREATE A PELLET PRODUCT OPERATION 111, process flow proceeds to COOL THE PELLET PRODUCT TO CREATE A COOLED BLEND OPERATION 113.

In one embodiment, at COOL THE PELLET PRODUCT RESULTING IN COOLED BLEND OPERATION 113, the pellet product is cooled by passing air through the pellet product, resulting in a cooled blend.

In one embodiment, the pellet product is cooled to a moisture level range of 4%-20% by passing air through the pellet product. At this point, the cooled blend will typically be at room temperature, or nearly so.

In one embodiment, once the cooled blend is created, process flow proceeds with SHIP AND/OR STORE THE COOLED BLEND OPERATION 115.

In one embodiment, once the cooled blend is shipped and/or stored at SHIP AND/OR STORE THE COOLED BLEND OPERATION 115, operation flow proceeds to APPLY THE COOLED BLEND TO SOIL OPERATION 117.

Depending on the particular requirements of the application, the application rate of the cooled blend to whatever plant substrate is being used, most commonly soil, at APPLY THE COOLED BLEND TO SOIL OPERATION 117 is anywhere in a range of approximately 20 to 10,000 pounds per acre.

In one embodiment, once the cooled blend is applied to the soil at APPLY THE COOLED BLEND TO SOIL OPERATION 117, process flow proceeds to EXIT OPERATION 120 and process 100 is exited.

Using process 100 for creating a combination organic fertilizer product, a combination organic fertilizer product is provided that is environmentally benign; is non-pathogenic; is derived from natural organic sources; does not require significant processing; has minimal odor; is easily handled and applied; can be applied directly to soil supporting agricultural vegetation; includes time-released nitrogen components which become bioavailable to agricultural vegetation by beneficial microbial digestion in soil; and eliminates chemical crop burning.

It should be noted that the language used in the specification has been primarily selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A combination organic fertilizer product consisting of a mixture of poultry manure, soybean meal and guano, wherein the combination organic fertilizer product consists of from 70 to 90% poultry manure, from 1% to 20% soybean meal and from 1% to 20% guano.

2. A combination organic fertilizer product consisting of a mixture of poultry manure, soybean meal and guano, wherein the combination organic fertilizer product consists of from 1 to 20% poultry manure, from 60 to 90% soybean meal and from 9% to 30% guano.

3. A combination organic fertilizer product consisting of a mixture of poultry manure, soybean meal and guano, wherein the combination organic fertilizer product consists of from 50 to 70% poultry manure, from 10 to 30% soybean meal and from 10% to 30% guano.

4. A combination organic fertilizer product consisting of a mixture of poultry manure, soybean meal and guano, wherein the combination organic fertilizer product consists of from 1 to 20% poultry manure, from 10 to 30% soybean meal and from 60% to 80% guano.

5. A process of manufacturing a combination organic fertilizer product comprising:
   obtaining individual quantities of a first ingredient of poultry manure, a second ingredient of soybean meal and a third ingredient of guano;
   combining at least part of the obtained quantity of the poultry manure, at least part of the obtained quantity of soybean meal and at least part of the obtained quantity of the guano to create a combination organic fertilizer product consisting of a mixture of poultry manure, soybean meal, and guano; and
   processing the combination organic fertilizer product to create a processed combination organic fertilizer product.

6. The process of claim 5 wherein the combination organic fertilizer product comprises 70 to 90% poultry manure, 1% to 20% soybean meal and 1% to 20% guano.

7. The process of claim 5 wherein the combination organic fertilizer product comprises 1 to 20% poultry manure, 60 to 90% soybean meal and 9% to 30% guano.

8. The process of claim 5 wherein the combination organic fertilizer product comprises 50 to 70% poultry manure, 10 to 30% soybean meal and 10% to 30% guano.

9. The process of claim 5 wherein the combination organic fertilizer product comprises 1 to 20% poultry manure, 10 to 30% soybean meal and 60% to 80% guano.

10. The process of claim 5, further wherein combining at least part of the obtained quantity of the poultry manure, at least part of the obtained quantity of soybean meal and at least part of the obtained quantity of the guano to create a combination organic fertilizer product further comprises mixing the at least part of the quantity of the poultry manure, at least part of the quantity of the soybean meal and at least part of the quantity of the guano until the at least a portion of at least one of the combined first, second and third ingredients are homogeneously mixed.

11. The process of claim 5, further comprising:
screening one or more of the first, second and third ingredients prior to processing the combination organic fertilizer product.

12. The process of claim 5, further comprising:
heating one or more of the first, second and third ingredients to a minimum of 130 degrees Fahrenheit.

13. The process of claim 5, further comprising:
heating at least one of the individual ingredients of the first, second and third ingredients to a minimum of 130 degrees Fahrenheit prior to combining at least part of the quantity of the poultry manure, at least part of the quantity of soybean meal and at least part of the quantity of the guano.

14. The process of claim 5, wherein processing the combination organic fertilizer product to create a combination organic fertilizer product includes processing the combination of the first, second and third ingredients by heating, cooling and/or screening.

15. The process of claim 5, further comprising:
heating the combination organic fertilizer product; and
cooling the heated combination organic fertilizer product to a moisture level of 4% to 20% by passing air through the heated combination organic fertilizer product.

16. The process of claim 5, further comprising:
screening the combination organic fertilizer product.

17. The process of claim 5, further comprising:
heating the combination organic fertilizer product to a minimum of 160 degrees Fahrenheit.

\* \* \* \* \*